(12) United States Patent
Kono et al.

(10) Patent No.: US 11,975,706 B2
(45) Date of Patent: May 7, 2024

(54) DRIVING CONTROL DEVICE, DRIVING CONTROL METHOD, AND NON-TRANSITORY STORAGE MEDIUM

(71) Applicant: TOYOTA JIDOSHA KABUSHIKI KAISHA, Toyota (JP)

(72) Inventors: Katsumi Kono, Toyota (JP); Tomoharu Maeda, Toyota (JP); Takaaki Tokura, Nagoya (JP); Takeshi Yasuda, Yokkaichi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 309 days.

(21) Appl. No.: 17/653,726

(22) Filed: Mar. 7, 2022

(65) Prior Publication Data

US 2022/0306074 A1 Sep. 29, 2022

(30) Foreign Application Priority Data

Mar. 26, 2021 (JP) ................................. 2021-053439

(51) Int. Cl.
| | | |
|---|---|---|
| *B60W 20/14* | (2016.01) | |
| *B60L 58/13* | (2019.01) | |
| *B60L 58/15* | (2019.01) | |
| *B60W 30/18* | (2012.01) | |

(52) U.S. Cl.
CPC ............ *B60W 20/14* (2016.01); *B60L 58/13* (2019.02); *B60L 58/15* (2019.02); *B60W 30/18127* (2013.01); *B60L 2260/54* (2013.01); *B60W 2556/10* (2020.02)

(58) Field of Classification Search
CPC ........... B60W 20/14; B60W 30/18127; B60W 2556/10; B60W 10/06; B60W 10/08; B60W 20/12; B60W 2710/244; B60L 58/13; B60L 58/15; B60L 2260/54; B60L 2240/62; B60L 2260/52; B60L 7/10; B60L 50/16; B60L 50/60; B60L 7/22
See application file for complete search history.

(56) References Cited

U.S. PATENT DOCUMENTS

| | | | | |
|---|---|---|---|---|
| 11,807,214 | B2 * | 11/2023 | Tokura ................ | B60W 40/105 |
| 2009/0114463 | A1 * | 5/2009 | DeVault ............... | B60W 20/12 |
| | | | | 180/65.29 |
| 2017/0066429 | A1 * | 3/2017 | Ogawa ................. | B60W 10/06 |

(Continued)

FOREIGN PATENT DOCUMENTS

JP   4702086 B2   6/2011

*Primary Examiner* — Richard M Camby
(74) *Attorney, Agent, or Firm* — Oblon, McClelland, Maier & Neustadt, L.L.P.

(57) ABSTRACT

A driving control device that is mounted on a vehicle including an electric motor and an internal combustion engine as power sources includes a processor. The processor is configured to: acquire a destination of the vehicle; acquire a past driving history from a point of departure to the destination; acquire a desired state of charge that is a state of charge of a battery desired when the vehicle arrives at the destination; estimate a predicted amount of regenerative energy based on the driving history; set a first section and a second section based on the predicted amount of regenerative energy and the desired state of charge; and control driving of the vehicle based on the first section and the second section.

9 Claims, 7 Drawing Sheets

(56) References Cited

U.S. PATENT DOCUMENTS

| | | | | |
|---|---|---|---|---|
| 2019/0322267 A1* | 10/2019 | Kurihashi | ............. | B60W 10/06 |
| 2021/0138909 A1* | 5/2021 | Tokura | .................. | B60W 40/13 |
| 2022/0126810 A1* | 4/2022 | Tokura | ............ | B60W 30/18127 |
| 2022/0153272 A1* | 5/2022 | Tokura | .................. | B60W 50/00 |
| 2022/0219671 A1* | 7/2022 | Ogawa | .................. | B60W 10/06 |

* cited by examiner

DRIVING CONTROL DEVICE, DRIVING CONTROL METHOD, AND NON-TRANSITORY STORAGE MEDIUM

CROSS-REFERENCE TO RELATED APPLICATION

This application claims priority to Japanese Patent Application No. 2021-053439 filed on Mar. 26, 2021, incorporated herein by reference in its entirety.

BACKGROUND

1. Technical Field

The present disclosure relates to driving control devices that are mounted on vehicles, driving control methods, and non-transitory storage media.

2. Description of Related Art

In a hybrid electric vehicle including an electric motor and an internal combustion engine, fuel efficiency can be improved by driving control in which the electric motor and the internal combustion engine are efficiently used according to the situation.

Japanese Patent No. 4702086 (JP 4702086 B) discloses a vehicle driver assistance device that provides a driver with a braking start point at which a regenerative braking operation needs to be started, based on the position of a vehicle and map information of points at which the vehicle needs to be stopped or points at which the vehicle needs to be decelerated such as railroad crossings and curves. In this vehicle driver assistance device, the amount of regenerative energy recovery can be increased by encouraging the driver to activate regenerative braking at such a deceleration that allows efficient recovery of regenerative energy.

SUMMARY

The technique described in JP 4702086 B can predict a point at which regenerative energy recovery can be expected. However, the technique described in JP 4702086 B cannot quantitatively predict the amount of regenerative energy recovery. If the amount of regenerative energy recovery can be quantitatively predicted at an early stage, the recovered regenerative energy may be able to be used for suitable driving control.

The present disclosure provides a driving control device, a driving control method, and non-transitory storage medium that quantitatively predict the amount of regenerative energy recovery to use the recovered regenerative energy for driving control.

A first aspect of a technique of the present disclosure is a driving control device that is mounted on a vehicle including an electric motor and an internal combustion engine as power sources. The driving control device includes a processor. The processor is configured to acquire a destination of the vehicle. The processor is configured to acquire a past driving history from a point of departure to the destination. The processor is configured to acquire a desired state of charge that is a state of charge of a battery desired when the vehicle arrives at the destination. The battery is mounted on the vehicle. The processor is configured to estimate a predicted amount of regenerative energy based on the driving history, the regenerative energy being energy that is recovered by regenerative braking of the electric motor. The processor is configured to set a first section and a second section based on the predicted amount of regenerative energy and the desired state of charge. The first section is a section in which only the electric motor is driven for driving of the vehicle. The second section is a section in which at least the internal combustion engine is driven for driving of the vehicle. The processor is configured to control driving of the vehicle based on the first section and the second section.

In the driving control device according to the first aspect of the technique of the present disclosure, the driving history may include information showing in chronological order a change in power generated by the power sources during driving from the point of departure to the destination in a past.

In the driving control device according to the first aspect of the technique of the present disclosure, the processor may be configured to estimate a time integral value of a magnitude of power generated by the power sources during a period in which energy is recoverable as the predicted amount of regenerative energy. The period may be a period in which the power generated by the power sources in the driving history is negative.

In the driving control device according to the first aspect of the technique of the present disclosure, the processor may be configured to set the first section and the second section in such a manner that all the predicted amount of regenerative energy is consumed when the vehicle arrives at the destination.

In the driving control device according to the first aspect of the disclosed technology, the processor may be configured to set the first section and the second section in such a manner that the state of charge of the battery does not become higher than an allowable upper limit or does not become lower than an allowable lower limit.

In the driving control device according to the first aspect of the disclosed technique, the processor may be configured to derive a difference between a first integral value and a second integral value. The first integral value may be a time integral value of a magnitude of power generated by the power sources up to a current point based on the driving history. The second integral value may be a time integral value of a magnitude of power generated by the power sources based on actual driving of the vehicle. The processor may be configured to reset the first section and the second section from the current point to the destination when an absolute value of the derived difference is equal to or larger than a predetermined reference value.

In the driving control device according to the first aspect of the technique of the present disclosure, the processor may be configured to arbitrate between or among states of charge of the battery that are requested by a plurality of applications. The processor may be configured to acquire an arbitration result as the desired state of charge.

A second aspect of the technique of the present disclosure is a driving control method that is performed by a driving control device that is mounted on a vehicle including an electric motor and an internal combustion engine as power sources. The method includes: acquiring a destination of the vehicle; acquiring a past driving history from a point of departure to the destination; acquiring a desired state of charge that is a state of charge of a battery desired when the vehicle arrives at the destination; estimating a predicted amount of regenerative energy based on the driving history; setting a first section and a second section based on the predicted amount of regenerative energy and the desired state of charge; and controlling driving of the vehicle based on the first section and the second section. The battery is mounted on the vehicle. The regenerative energy is energy that is recovered by regenerative braking of the electric motor. The first section is a section in which only the electric motor is driven for driving of the vehicle. The second section is a section in which at least the internal combustion engine is driven for driving of the vehicle.

A third aspect of the technique of the present disclosure is a non-transitory storage medium storing instructions that are executable by one or more processors of a driving control device mounted on a vehicle including an electric motor and an internal combustion engine as power sources and that cause the one or more processors to perform functions. The functions include: acquiring a destination of the vehicle; acquiring a past driving history from a point of departure to the destination; acquiring a desired state of charge that is a state of charge of a battery desired when the vehicle arrives at the destination; estimating a predicted amount of regenerative energy based on the driving history; setting a first section and a second section based on the predicted amount of regenerative energy and the desired state of charge; and controlling driving of the vehicle based on the first section and the second section. The battery is mounted on the vehicle. The regenerative energy is energy that is recovered by regenerative braking of the electric motor. The first section is a section in which only the electric motor is driven for driving of the vehicle. The second section is a section in which at least the internal combustion engine is driven for driving of the vehicle.

According to the driving control device of the present disclosure, the amount of regenerative energy recovery is quantitatively estimated using the driving history based on the past driving of the vehicle, and suitable driving control can be implemented in consideration of the desired state of charge of the battery based on the estimated amount of regenerative energy recovery.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

A driving control device according to an embodiment quantitatively estimates the amount of regenerative energy recovery at an early stage using a driving power profile. A driving power profile shows in chronological order a predicted change in driving power that is generated by a power source during driving from a point of departure to a destination. By using the estimation results, the driving control device can perform suitable driving control in consideration of a desired state of charge (SOC) of a battery. An embodiment of the present disclosure will be described with reference to the drawings.

Embodiment

Configuration

Figure 1:
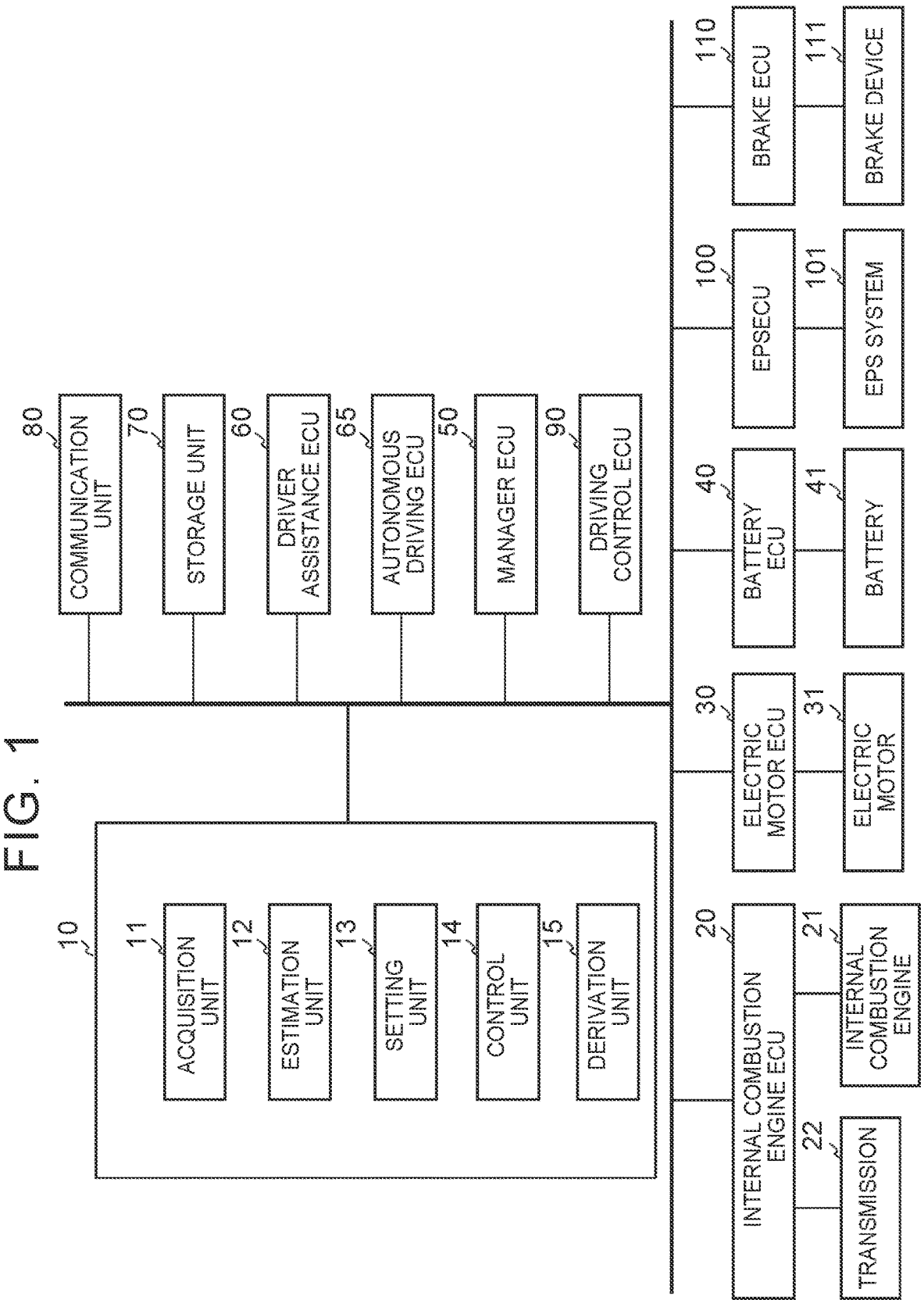
FIG. 1 is a functional block diagram of a driving control device and its peripheral components according to an embodiment of the present disclosure.

FIG. 1 shows functional blocks of a driving control device 10 and its peripheral components according to an embodiment of the present disclosure. The driving control device 10 is mounted on a vehicle. In addition to the driving control device 10, the following configurations are mounted on the vehicle: an internal combustion engine electronic control unit (ECU) 20, an internal combustion engine (ENG) 21, a transmission 22, an electric motor ECU 30, an electric motor (MG) 31, a battery ECU 40, a battery 41, a manager ECU 50, a driver assistance ECU 60, an autonomous driving ECU 65, a storage unit 70, a communication unit 80, a driving control ECU 90, an electric power steering (EPS) ECU 100, an EPS system 101, a brake ECU 110, and a brake device 111.

In addition to the above configurations, various devices may be mounted on the vehicle such as various sensors like accelerator pedal sensor, brake pedal sensor, camera, obstacle sensor, vehicle speed sensor, yaw rate sensor, Global Positioning System (GPS) sensor, and a navigation system, although these devices are not shown in the figures.

The internal combustion engine 21 and the electric motor 31 are actuators that serve as a power source for driving the vehicle. The electric motor 31 is also a generator that generates electric power and a braking device that generates a braking force, both by regenerative braking.

The internal combustion engine ECU 20 controls the internal combustion engine 21 and the transmission 22 that changes the rotational speed between its input and output. The internal combustion engine ECU 20 performs control to generate driving torque and to generate braking torque by engine braking.

The electric motor ECU 30 controls the electric motor 31 to generate driving torque and to generate braking torque by regenerative braking.

The battery 41 is an in-vehicle battery. The battery 41 supplies electric power to the electric motor 31 and other devices by electric discharge, and is charged with electric power (recovered energy) obtained by regenerative braking of the electric motor 31. The battery ECU 40 controls power charging and discharging of the battery 41.

The driving control ECU 90 controls the internal combustion engine ECU 20 and the electric motor ECU 30 according to the drive mode that will be described later.

The EPS system 101 is an actuator that performs steering to change the steering angle of wheels and thus change the traveling direction of the vehicle. The EPS ECU 100 controls the EPS system 101.

The brake device (foot brake device) 111 is an actuator that generates a braking force by a frictional force against members that rotate with the wheels. The brake ECU 110 controls the brake device 111.

The driver assistance ECU 60 performs driver assistance functions such as collision avoidance, following a vehicle in front, and lane keeping. The driver assistance ECU 60 outputs instructions to control movement of the vehicle, such as acceleration, deceleration, and steering angle, based on information acquired from the various sensors etc. The functions of the driver assistance ECU 60 and the number of driver assistance ECUs 60 are not limited to the functions and number described above.

The autonomous driving ECU 65 performs autonomous driving functions. The autonomous driving ECU 65 outputs instructions to control movement of the vehicle, such as acceleration, deceleration, and steering angle, in order to perform the autonomous driving functions based on information acquired from the various sensors etc.

The manager ECU 50 sends instructions to the driving control ECU 90, the EPS ECU 100, the brake ECU 110, etc. (hereinafter collectively referred to as the actuator ECUs) based on the instructions from the driver assistance ECU 60, the autonomous driving ECU 65, etc. For example, the manager ECU 50 sends acceleration instructions to the driving control ECU 90. The manager ECU 50 sends steering instructions to the EPS ECU 100. The manager ECU 50 sends deceleration instructions to the driving control ECU 90 and the brake ECU 110.

When the manager ECU 50 receives instructions from a plurality of the driver assistance ECUs 60 etc., the manager ECU 50 performs a process called arbitration based on a predetermined rule. The arbitration process is a process of determining which instruction to follow to control the vehicle. The manager ECU 50 sends instructions to the actuator ECUs based on the arbitration result. The content of the driving operations of a steering wheel, a brake pedal, an accelerator pedal, etc. manually performed by a driver are acquired by the manager ECU 50. The content of the driving operations may be subject to the arbitration process that is performed by the manager ECU 50. The content of the driving operations may be acquired by the actuator ECUs, and the actuator ECUs may individually arbitrate between the manual driving operations by the driver and the instructions from the manager ECU 50.

The storage unit 70 stores driving histories of the vehicle. Driving histories are a record of past driving events of the vehicle. A driving history includes information on driving power generated by the power sources (internal combustion engine 21 and electric motor 31) at each point in time during a period in which the vehicle was driven. The driving power includes drive power of the internal combustion engine 21, drive power of the electric motor 31, and absorbed power of the electric motor 31. For example, a driving history is generated by periodically storing information on the driving power derived based on the various sensors etc. of the vehicle in the storage unit 70 while a power supply system of the vehicle is on. For example, the storage unit 70 may be a part of a car navigation system.

The communication unit 80 can wirelessly communicate with a server outside the vehicle, other vehicles, etc. The communication unit 80 can receive driving histories other than the user's driving histories obtained based on the driving results of other vehicles.

The driving control device 10 is an electronic control unit that controls driving of the vehicle. The driving control device 10 includes an acquisition unit 11, an estimation unit 12, a setting unit 13, a control unit 14, and a derivation unit 15.

The acquisition unit 11 acquires information on a destination of the vehicle, a driving history from a point of departure to the destination, and a desired state of charge of the battery 41 upon arrival at the destination (first acquisition unit, second acquisition unit, and third acquisition unit). The estimation unit 12 estimates a predicted amount of regenerative energy based on the information acquired by the acquisition unit 11. The regenerative energy is energy that is recoverable by regenerative braking. The setting unit 13 sets a section in which the electric motor 31 is used for driving and a section in which the internal combustion engine 21 is used for driving, based on the predicted amount of regenerative energy estimated by the estimation unit 12 and the desired state of charge. The control unit 14 controls driving of the vehicle based on the sections set by the setting unit 13. The derivation unit 15 derives the difference between the driving power based on the driving history and the driving power based on actual driving of the vehicle. The derivation unit 15 may drive a difference between a time integral value of a magnitude of power generated by the power sources up to a current point based on the driving history and a time integral value of a magnitude of power generated by the power sources based on actual driving of the vehicle. The time integral value of a magnitude of power generated by the power sources up to a current point based on the driving history is an example of "the first integral value". The time integral value of a magnitude of power generated by the power sources based on actual driving of the vehicle is an example of "the second integral value".

Each of the ECUs described above typically consists of a computer including a memory, a processor, and an interface. For example, the processor of each ECU implements functions by reading and executing a program stored in a non-transitory memory. These ECUs are connected to each other by a communication line and can operate cooperatively by communicating with each other as appropriate.

The configurations of the devices mounted on the vehicle and the configuration of the driving control device 10 that are described above are illustrative, and addition, replacement, change, or omission can be made as appropriate. The functions of each device can be implemented by integration of the functions into one device or distribution of the functions between or among a plurality of devices as appropriate.

For example, the driving control device 10 may be an independent ECU, or may be a part of the manager ECU 50 or the driving control ECU 90. For example, the functions of the driving control device 10 may be distributed to the manager ECU 50 or the driving control ECU 90.

For example, the driving control device 10, the driver assistance ECU 60, the autonomous driving ECU 65, the manager ECU 50, and the driving control ECU 90 may be a single ECU. For example, the autonomous driving ECU 65 may not be provided in the vehicle.

Processes

Figure 3:
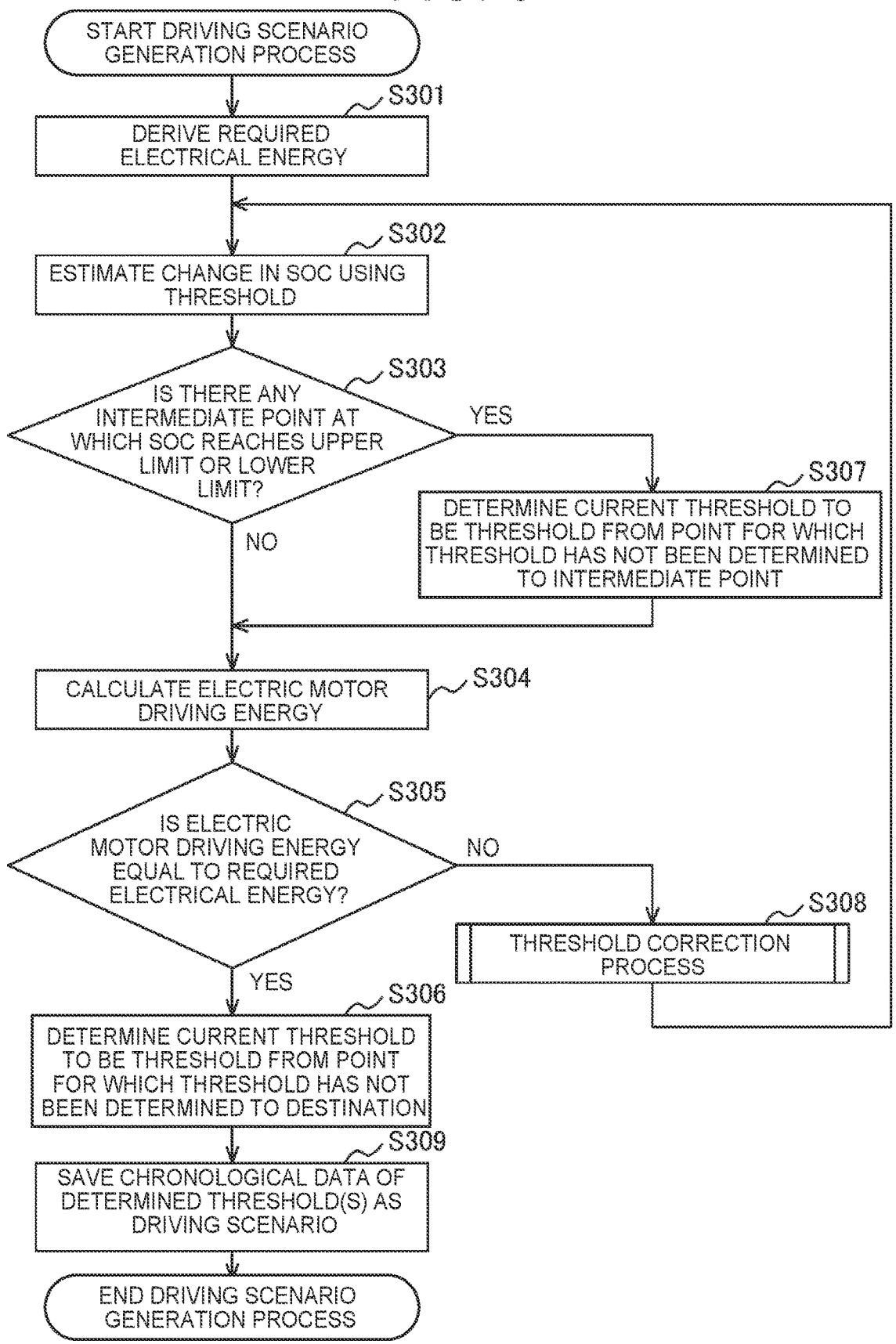
FIG. 3 is a flowchart showing an example of a driving scenario generation process that is performed by the driving control device.
Figure 4:
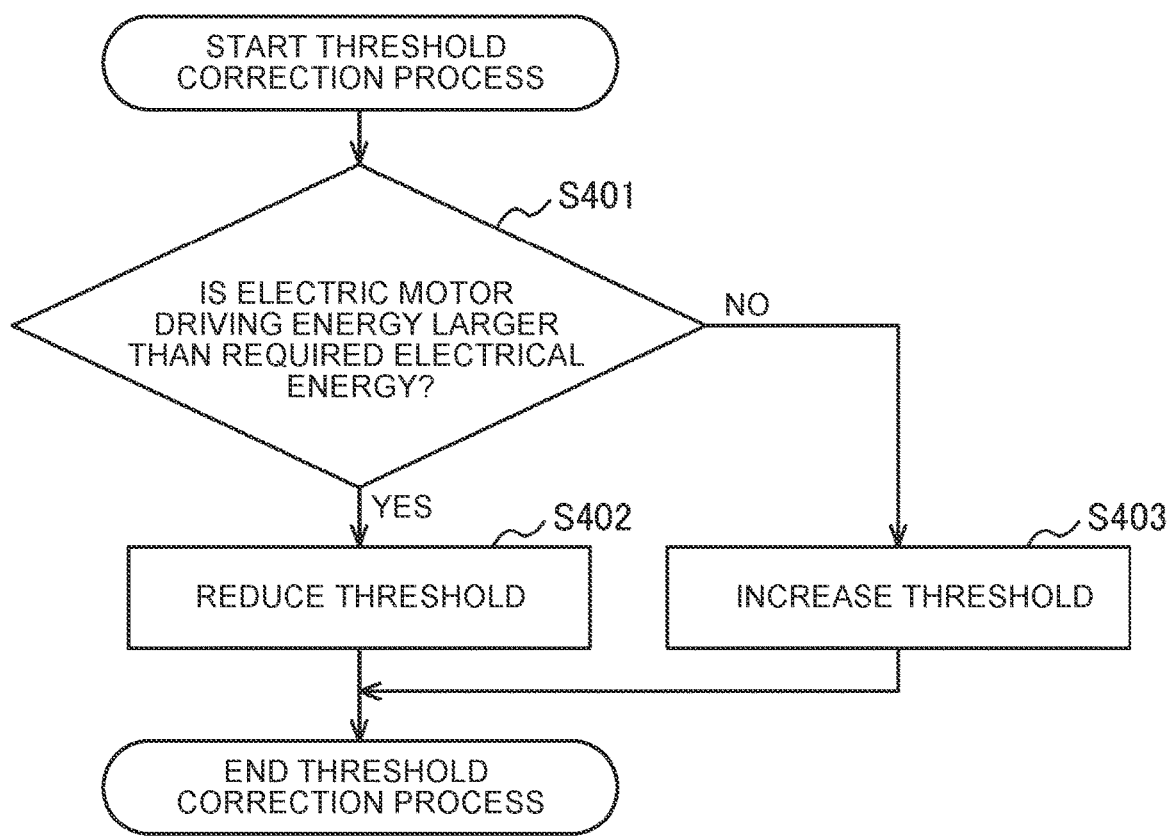
FIG. 4 is a flowchart showing an example of a threshold correction process that is performed by the driving control device.

Hereinafter, an example of processes that are performed by the driving control device 10 according to the present embodiment will be described in detail with further reference to FIGS. 2 to 4.

Figure 2:
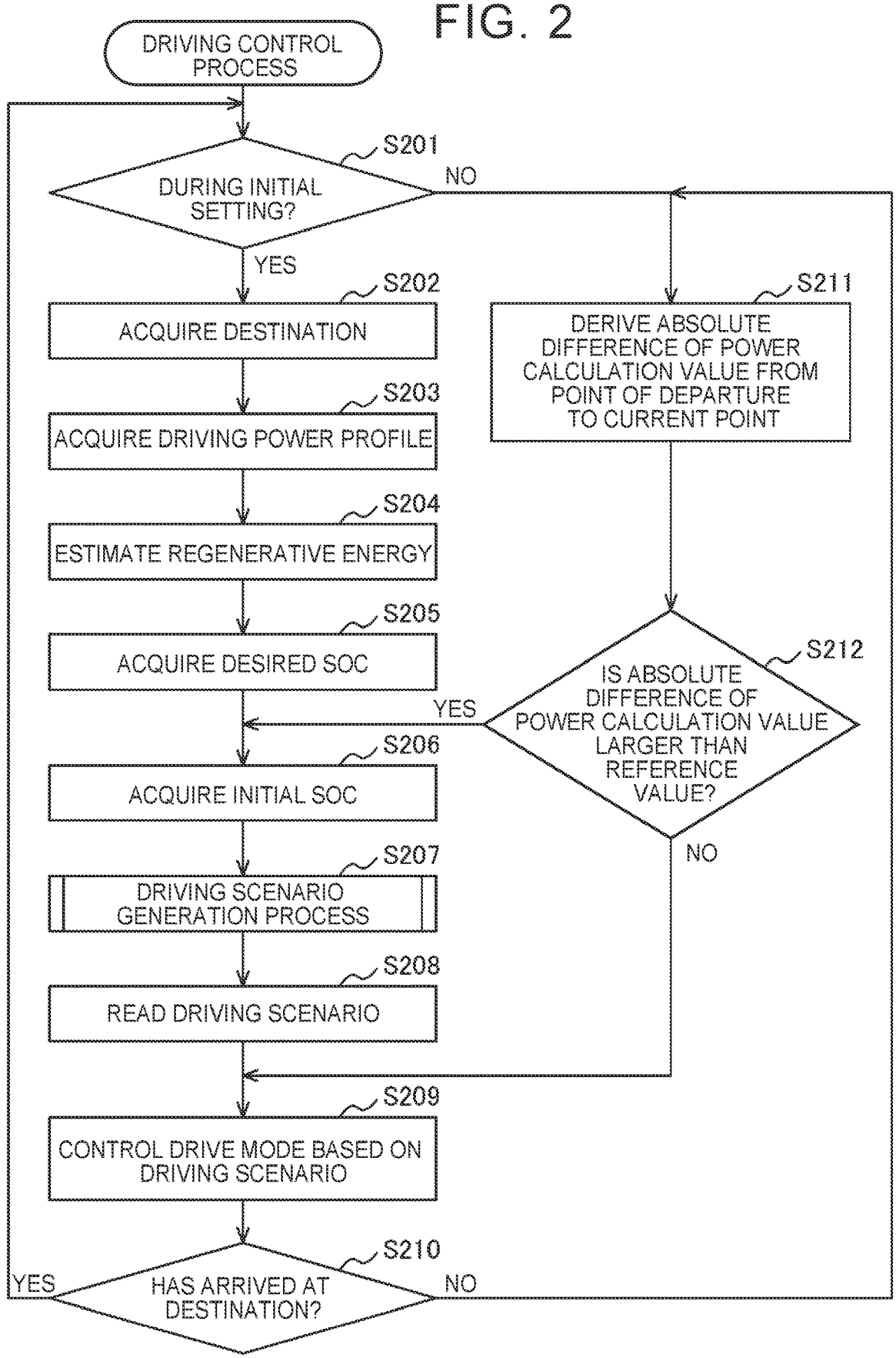
FIG. 2 is a flowchart showing an example of a driving control process that is performed by the driving control device.

FIG. 2 is a flowchart showing an example of a driving control process that is performed by the driving control device 10. For example, the driving control process is started when the driver etc. turns on the power supply system of the vehicle and starts a trip, and is performed until the driver etc. turns off the power supply system of the vehicle and ends the trip.

Step S201

The control unit 14 determines whether it is during initial setting (whether control of the drive mode based on the driving scenario has not been started yet or not). When it is during initial setting (S201, YES), the routine proceeds to step S202. When it is not during initial setting (S201, NO), the routine proceeds to step S211.

Step S202

The acquisition unit 11 acquires a destination. For example, the destination is given by information on latitude and longitude. The destination is an end point where the vehicle finishes driving as a trip, or a desired intermediate point set at an intermediate position on a route to the end point. Examples of the desired intermediate point include points entering and leaving a geofencing area. The acquisition unit 11 may acquire a destination through manual input by an occupant of the vehicle etc., or may acquire a destination through automatic input by the navigation system mounted on the vehicle, remote control from a management center outside the vehicle, etc. When the acquisition unit 11 automatically acquires a destination, the acquisition unit 11 may acquire a destination based on the current position, date, time, day of the week, etc. before the vehicle starts driving, or may acquire a destination based on the traveling direction of the vehicle etc. after the vehicle starts driving. After the acquisition unit 11 acquires a destination, the routine proceeds to step S203.

Step S203

Figure 5:
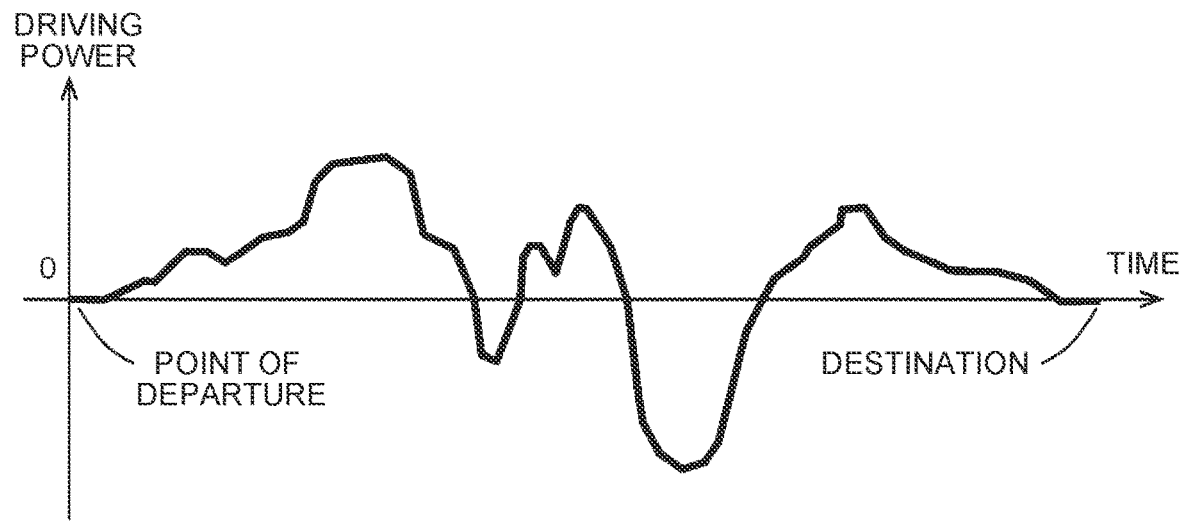
FIG. 5 shows an example of a driving power profile.

The acquisition unit 11 acquires a driving power profile. A driving power profile is power information showing in chronological order a predicted change in driving power that is generated by the power sources (internal combustion engine 21 and electric motor 31) at each point in time during driving from a point of departure (current point) to a destination. FIG. 5 shows an example of a driving power profile. In FIG. 5, the abscissa represents the elapsed time from the start of driving, and the ordinate represents the driving power. The driving power profile that is acquired by the acquisition unit 11 is generated (or extracted) based on, for example, the information stored in the storage unit 70, that is, the past driving history(ies) for the same route from the point of departure to the destination.

Simple examples of generating a driving power profile will be described. For example, when the route from the point of departure to the destination is a commuting route in which the vehicle is driven at almost the same time of the day along almost the same path, it is considered that the change patterns of the driving power generated by the power sources are almost the same in a plurality of past driving histories stored corresponding to this commuting route. In this case, a driving power profile may be generated based on any one of the past driving histories. When driving histories have attributes such as the day of the week and the time of the day that the vehicle was driven, a driving power profile may be generated based on the driving history with a large number of attributes matching those of the current driving. When the navigation system mounted on the vehicle creates a driving route from the point of departure to the destination, a driving power profile may be generated based on the driving history with a high degree of similarity to this driving route.

When there is a plurality of candidate driving histories for a driving power profile, a driving power profile may be generated based on a desired one of the candidate driving histories, or a driving power profile may be generated based on the average of the candidate driving histories. When the driving history(ies) is vehicle information (vehicle speed, etc.) other than power information showing in chronological order a change in driving power generated by the power sources during driving of the vehicle, a driving power profile can be generated based on the vehicle information. The method for generating a driving power profile is not limited, and the above methods may be combined as appropriate. After the acquisition unit 11 acquires a driving power profile, the routine proceeds to step S204.

Step S204

Figure 6:
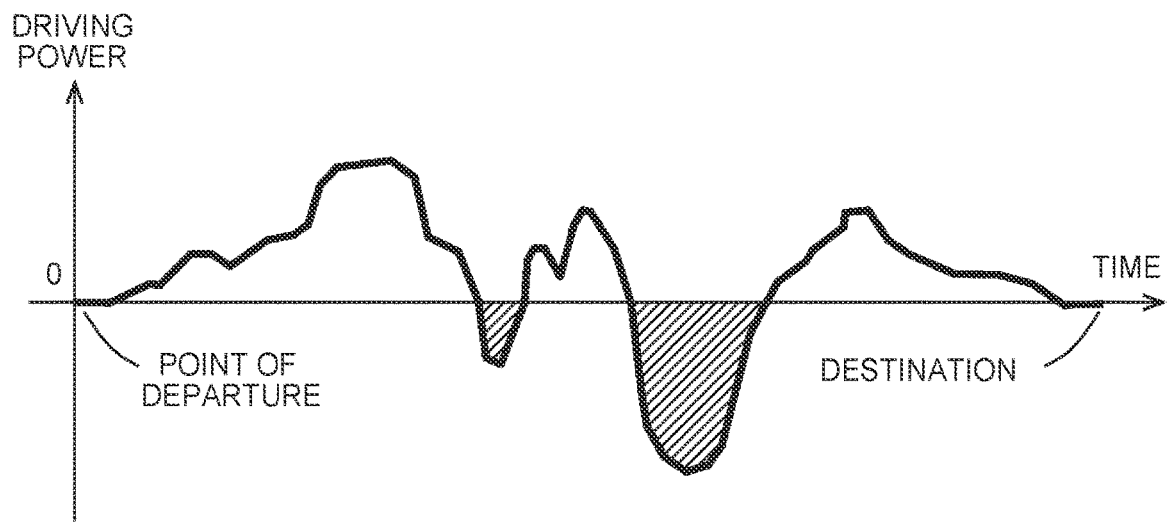
FIG. 6 shows regions of regenerative energy in the driving power profile.

The estimation unit 12 estimates regenerative energy $E\_est$. The regenerative energy $E\_est$ is the energy obtained by regenerative braking of the electric motor 31 from the point of departure to the destination. This estimation of the regenerative energy $E\_est$ is performed based on the driving power profile. Specifically, the period in which the driving power has a negative value (less than 0) in the driving power profile is the period in which the regenerative energy is expected to be recoverable. The time integral value of the magnitude of the driving power during the period in which the driving power has a negative value, that is, the area of the hatched regions in FIG. 6, is calculated as the estimated regenerative energy $E\_est$. When estimating this regenerative energy $E\_est$, the estimated value may be corrected in consideration of fluctuation factors such as an increase in vehicle weight due to loading etc. and bad weather. After the regenerative energy $E\_est$ is estimated, the routine proceeds to step S205.

The driving power profile stored in the storage unit 70 as the past driving history can be approximate data rather than actual data due to restrictions on the amount of memory of the storage unit 70 etc. In such a case, the integrated value of the negative driving powers may be stored as a driving history separately from the driving power profile in order to improve the estimation accuracy of the regenerative energy $E\_est$.

Step S205

The acquisition unit 11 acquires a desired state of charge $SOC\_tgt$. The desired state of charge $SOC\_tgt$ is a desired state of charge of the battery 41 when the vehicle arrives at the destination. The desired state of charge $SOC\_tgt$ can be the state of charge of the battery 41 desired by an occupant or system of the vehicle etc. The acquisition unit 11 may acquire a desired state of charge $SOC\_tgt$ through manual input by the occupant of the vehicle etc., or may acquire a desired state of charge $SOC\_tgt$ through automatic input by the navigation function of the vehicle, remote control from the management center outside the vehicle, etc.

For example, when the destination is a home with charging equipment, the battery 41 can be charged after returning home. Therefore, the desired state of charge $SOC\_tgt$ can be set to a value lower than a standard value. When a large amount of electric power is planned to be used at the destination (home etc.), the desired state of charge $SOC\_tgt$ can be set to a value higher than the standard value. When the destination is a boundary with a specific area where electric vehicle (EV) driving is required, the desired state of charge $SOC\_tgt$ can be set to a value higher than the standard value in order to enable long-time EV driving in the specific area. After the desired state of charge $SOC\_tgt$ is acquired, the routine proceeds to step S206.

Step S206

The acquisition unit 11 acquires an initial state of charge $SOC\_stt$. The initial state of charge $SOC\_stt$ is a state of charge of the battery 41 when a driving scenario is to be generated. When the control unit 14 determines in step S201 that it is during initial setting, the initial state of charge SOC_stt is a state of charge of the battery 41 at the start of driving when a driving scenario is generated for the first time. When the control unit 14 determines in step S201 that it is not during initial setting, the initial state of charge SOC_stt is a state of charge of the battery 41 during driving (intermediate point) when a driving scenario is generated again. The acquisition unit 11 can acquire the initial state of charge SOC_stt of the battery 41 from the battery ECU 40 etc. mounted on the vehicle. After the initial state of charge SOC_stt is acquired, the routine proceeds to step S207.

Step S207

The setting unit 13 performs a process of generating a driving scenario (driving scenario generation process). The driving scenario is information in which a threshold for dividing a route from a current point to a destination into a section in which the vehicle is driven using only the electric motor 31 (hereinafter referred to as "first section") and a section in which the vehicle is driven using at least the internal combustion engine 21 (hereinafter referred to as "second section") is set in chronological order. This driving scenario generation process will be described later. After the driving scenario is generated, the routine proceeds to step S208.

Step S208

The control unit 14 reads the driving scenario generated by the driving scenario generation process. After the driving scenario is read, the routine proceeds to step S209.

Step S209

The control unit 14 controls the drive mode based on the driving scenario. More specifically, the control unit 14 determines a section in which the magnitude of the driving power is equal to or smaller than the threshold of the driving scenario to be a first section, and a section in which the magnitude of the driving power is larger than the threshold of the driving scenario to be a second section. In the first section, the control unit 14 selects an "electric motor mode" in which only the electric motor 31 is driven as the drive mode, and notifies the driving control ECU 90 of the selected drive mode. In response to this notification, the driving control ECU 90 causes the electric motor ECU 30 to control driving using the electric motor 31. In the second section, the control unit 14 selects, for example, an "internal combustion engine mode" in which only the internal combustion engine 21 is driven as the drive mode, and notifies the driving control ECU 90 of the selected drive mode. In response to this notification, the driving control ECU 90 causes the internal combustion engine ECU 20 to control driving using the internal combustion engine 21. After the drive mode is controlled, the routine proceeds to step S210.

In the electric motor mode, regenerative braking is performed by the electric motor 31 and kinetic energy of the vehicle is recovered as electric power. When a certain level or higher of deceleration is required by the driver depressing the brake pedal to a large extent or by the driver assistance ECU 60 sending a sudden deceleration instruction having a high priority for collision avoidance etc., the manager ECU 50 and the brake ECU 110 perform control to cause the brake device 111 to generate a braking force, in order to generate a sufficient braking force.

An example in which the drive mode for the second section of the driving scenario is the internal combustion engine mode in which only the internal combustion engine 21 is driven to drive the vehicle. However, in hybrid driving, the state of charge of the battery 41 is controlled to be substantially constant. Accordingly, in hybrid driving, a "hybrid mode" in which at least the internal combustion engine 21 is driven to drive the vehicle may be selected as the drive mode for the second section instead of the internal combustion engine mode.

Step S210

The control unit 14 determines whether the vehicle has arrived at the destination. When the vehicle has arrived at the destination (S210, YES), the routine proceeds to step S201 in order to generate a driving scenario for the next destination. When the vehicle has not yet arrived at the destination (S210, NO), the routine proceeds to step S211.

Step S211

The derivation unit 15 derives an absolute difference $E\_d(t)$ of a power calculation value from the point of departure (t=0) to the current point (t=T). The absolute difference $E\_d(t)$ of the power calculation value is the absolute value of the difference between an integrated value $\Sigma P\_present(t)$ of the magnitude of the driving power obtained by actual driving of the vehicle and an integrated value $\Sigma P\_past(t)$ of the magnitude of the driving power calculated based on the driving power profile, as shown by the following equation (1). For example, the absolute difference $E\_d(t)$ of this power calculation value is derived at regular intervals after the vehicle leaves the point of departure. After the absolute difference $E\_d(t)$ of the power calculation value is derived, the routine proceeds to step S212.

$$E\_d(t)=|\Sigma P\_past(t)-\Sigma P\_present(t)| \tag{1}$$

Step S212

The control unit 14 determines whether the absolute difference $E\_d(t)$ of the power calculation value derived by the derivation unit 15 is larger than a reference value C. This determination is made in order to reconsider whether the driving scenario needs to be reviewed. Therefore, the reference value C is set to, for example, such an appropriate predetermined value that a change in driving power based on the driving scenario generated at the point of departure deviates greatly from the driving power profile set based on the past driving history and it can be determined that the driving scenario needs to be regenerated. When the absolute difference $E\_d(t)$ of the power calculation value is larger than the reference value C ($E\_d(t)>C$) (S211, YES), the routine proceeds to step S206 in order to regenerate the driving scenario. When the absolute difference $E\_d(t)$ of the power calculation value is not larger than the reference value C ($E\_d(t) \leq C$) (S211, NO), the routine proceeds to step S209 in order to continue the drive mode control according to the current driving scenario.

The driving scenario generation process shown in step S207 of FIG. 2 will be described with reference to FIG. 3. FIG. 3 is a flowchart showing an example of the driving scenario generation process that is performed by the driving control device 10. Step S301

The setting unit 13 derives required electrical energy $E\_need$. The required electrical energy $E\_need$ is the electrical energy required for the state of charge of the battery 41 to be the desired state of charge SOC_tgt when the vehicle arrives at the destination. The required electrical energy $E\_need$ is derived by the following equation (2) based on the estimated regenerative energy $E\_est$, the initial state of charge SOC_stt, and a full charge capacity $C\_f$ of the battery 41. After the required electrical energy $E\_need$ is derived, the routine proceeds to step S302.

$$E\_need=E\_est+(SOC\_stt-SOC\_tgt) \times C\_f \tag{2}$$

Step S302

The setting unit 13 applies a threshold P_swt to the driving power profile to estimate a predicted change in state of charge SOC_clc of the battery 41 from the current point to the point of destination. The threshold P_swt is a value of the driving power that gives a timing to switch between the first section in which only the electric motor 31 is driven to drive the vehicle and the second section in which at least the internal combustion engine 21 is driven to drive the vehicle. The threshold P_swt can take a value between zero and maximum power that the vehicle can output. The threshold P_swt is set in advance to such an initial value that a low driving power region in which the efficiency of the internal combustion engine 21 is low is the first section. This initial value is modified as appropriate according to the content of the process. The current point is the point of departure in the driving scenario generation process performed at the time of initial setting. After a change in state of charge SOC_clc of the battery 41 is estimated, the routine proceeds to step S303.

Figure 7:
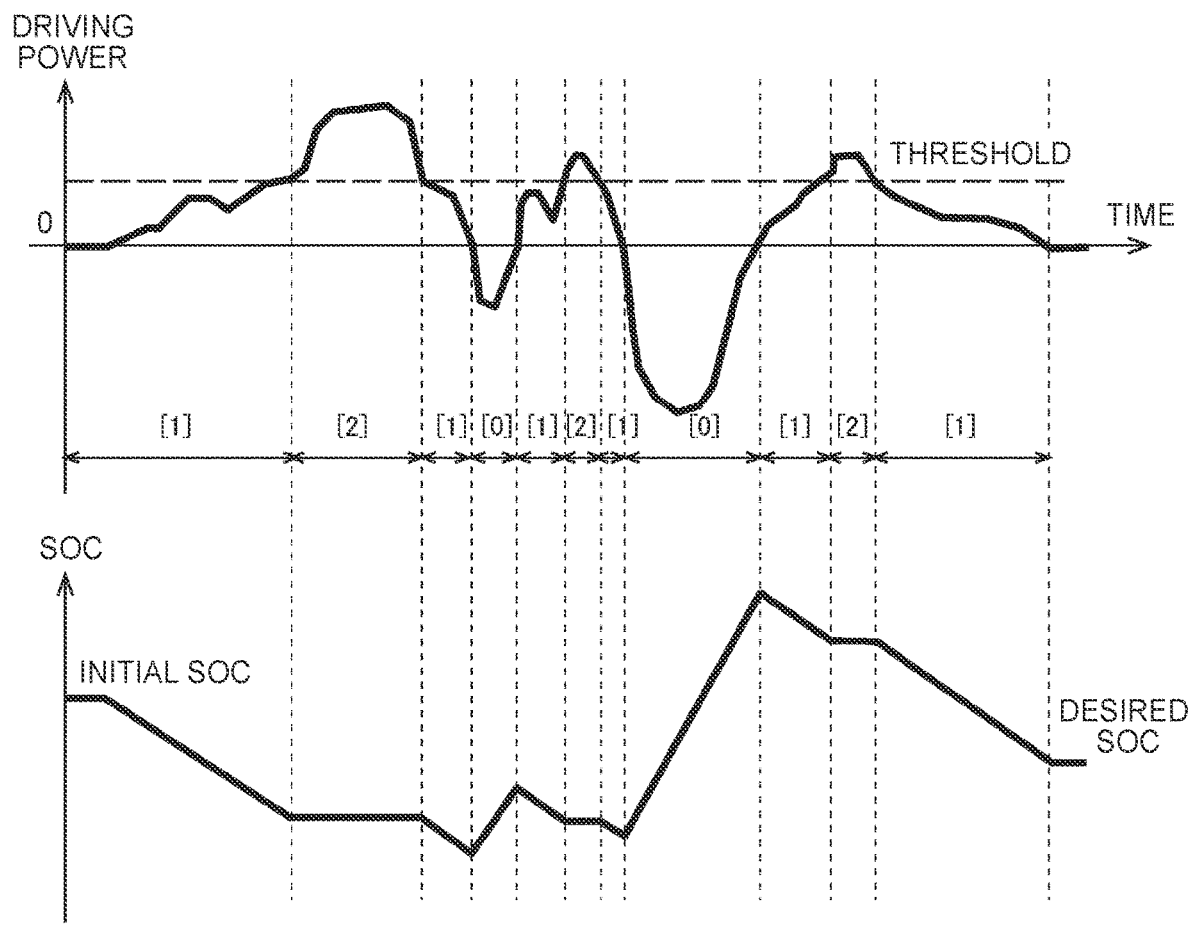
FIG. 7 shows an example of a change in state of charge of a battery.

FIG. 7 shows an example of the estimated change in state of charge SOC_clc of the battery 41. As illustrated in FIG. 7, in the first sections (periods [1] in the figure) in which the driving power is zero or more and less than the threshold in the driving power profile, the state of charge SOC_clc of the battery 41 decreases as the electric power is consumed by power running control of the electric motor 31. In the first sections in which the driving power is less than zero (periods [0] in the figure), the state of charge SOC_clc of the battery 41 increases as the battery 41 is charged due to regeneration control of the electric motor 31. In the second sections (periods [2] in the figure) in which the driving power is equal to or higher than the threshold, the state of charge SOC_clc of the battery 41 is maintained because the electric motor 31 does not consume electric power.

Step S303

Regarding the state of charge SOC_clc of the battery 41 whose change from the current point to the destination has been estimated, the setting unit 13 determines whether there is any intermediate point at which the state of charge SOC_clc reaches an allowable upper limit or lower limit of the battery 41. The allowable upper limit of the battery 41 is, for example, the state of charge at which the battery 41 becomes overcharged. The allowable upper limit of the battery 41 is, for example, the state of charge at which the battery 41 becomes overdischarged. When there is any intermediate point at which the state of charge SOC_clc reaches the allowable upper limit or the allowable lower limit (S303, YES), the routine proceeds to step S307. When there is no intermediate point at which the state of charge SOC_clc reaches the allowable upper limit or the allowable lower limit (S303, NO), the routine proceeds to step S304.

Step S304

The setting unit 13 calculates an estimated value of electric motor driving energy E_mg that is consumed by the electric motor 31 from the current point to the destination, based on the state of charge SOC_clc of the battery 41 whose change has been estimated. This electric motor driving energy E_mg is calculated based on the integrated value of the driving power in the first sections in which the driving power is zero or more and less than the threshold in the driving power profile to which the current threshold P_swt is applied. When there is a threshold determined in step S307 that will be described later, the current threshold P_swt and the determined threshold are applied to their corresponding periods, and the electric motor driving energy E_mg is calculated. After the electric motor driving energy E_mg is calculated, the routine proceeds to step S305.

Step S305

The setting unit 13 determines whether the electric motor driving energy E_mg is equal to the required electrical energy E_need (E_mg=E_need). This determination is made to determine whether the required electrical energy E_need has been able to be consumed with no excess or deficiency at the current threshold P_swt. When the electric motor driving energy E_mg is equal to the required electrical energy E_need (S305, YES), the routine proceeds to step S306. When the electric motor driving energy E_mg is not equal to the required electrical energy E_need (S305, NO), the routine proceeds to step S308.

Step S306

The setting unit 13 determines (confirms) the current threshold P_swt to be a normal threshold to be applied from a point for which a threshold has not been determined to the destination. In this step, the point for which a threshold has not been determined is the current point in the case where the state of charge SOC_clc changes without reaching the allowable upper limit or the allowable lower limit of the battery 41 even once. In the case where the state of charge SOC_clc reaches the allowable upper limit or the allowable lower limit of the battery 41 at least once, the point for which a threshold has not been determined is the last intermediate point at which the state of charge SOC_clc reaches the allowable upper limit or the allowable lower limit. After the threshold from the point for which a threshold has not been determined to the destination is determined, the routine proceeds to step S309.

Step S307

The setting unit 13 determines (confirms) the current threshold P_swt to be a normal threshold that is applied from a point for which a threshold has not been determined to the intermediate point. In this step, the point for which a threshold has not been determined is the current point in the case where this intermediate point is the first intermediate point at which the state of charge SOC_clc reaches the allowable upper limit or the allowable lower limit of the battery 41. In the case where this intermediate point is the second or later intermediate point at which the state of charge SOC_clc reaches the allowable upper limit or the allowable lower limit of the battery 41, the point for which a threshold has not been determined is the previous intermediate point. There is no limit to the number of intermediate points. After the threshold from the point for which a threshold has not been determined to the intermediate point is determined, the routine proceeds to step S304.

Step S308

The setting unit 13 performs a process of correcting the current threshold P_swt (threshold correction process). The threshold correction process will be described later. After the threshold P_swt is corrected, the routine proceeds to step S302.

Step S309

The setting unit 13 generates data in which one or more thresholds determined in steps S306 and S307 are connected in chronological order, and saves the generated data as a driving scenario to be applied to driving from the current point to the destination. The driving scenario generation process ends when the driving scenario is saved.

The threshold correction process shown in step S308 of FIG. 3 will be described with reference to FIG. 4. FIG. 4 is a flowchart showing an example of the threshold correction process that is performed by the driving control device 10.

Step S401

The setting unit 13 determines whether the electric motor driving energy E_mg is larger than the required electrical energy E_need (E_mg>E_need). This determination is made to determine how the threshold P_swt should be corrected. When the electric motor driving energy E_mg is larger than the required electrical energy E_need (S401, YES), the routine proceeds to step S402. When the electric motor driving energy E_mg is not larger than the required electrical energy E_need (S401, NO), the routine proceeds to step S403.

Step S402

The setting unit 13 reduces the threshold P_swt because the energy is insufficient even if all the estimated regenerative energy E_est is consumed. Specifically, the setting unit 13 changes the current threshold P_swt to a value obtained by reducing the current threshold P_swt by a small amount of power ΔP (P_swt−ΔP). The small amount of power ΔP can be set as desired based on the performance of the power sources, the difference between the electric motor driving energy E_mg and the required electrical energy E_need, etc. As a method of reducing the threshold P_swt in this step S402, the threshold P_swt may be corrected to the midpoint between the current threshold P_swt and a lower limit threshold P_swt_min that is the lowest threshold that can be set ((P_swt+P_swt_min)/2) (binary search method), other than reducing the threshold P_swt by the amount of power ΔP that is a fixed value as described above. The threshold correction process ends when the threshold P_swt is reduced.

Step S403

The setting unit 13 increases the threshold P_swt because the estimated regenerative energy E_est cannot be completely consumed. Specifically, the setting unit 13 changes the current threshold P_swt to a value obtained by increasing the current threshold P_swt by a small amount of power ΔP (P_swt+ΔP). The small amount of power ΔP can be set as desired based on the performance of the power sources, the difference between the electric motor driving energy E_mg and the required electrical energy E_need, etc. As a method of increasing the threshold P_swt in this step S403, the threshold P_swt may be corrected to the midpoint between the current threshold P_swt and an upper limit threshold P_swt_max that is the highest threshold that can be set ((P_swt+P_swt_max)/2) (binary search method), other than increasing the threshold P_swt by the amount of power ΔP that is a fixed value as described above. The threshold correction process ends when the threshold P_swt is increased.

Such a driving scenario that the estimated regenerative energy E_est is completely consumed as well as the desired state of charge SOC_tgt is achieved upon arrival at the destination may not be able to be generated depending on the acquired driving power profile and initial state of charge SOC_stt. In such a case, a driving scenario may be generated by giving priority to the estimated regenerative energy E_est being completely consumed or the desired state of charge SOC_tgt being achieved upon arrival at the destination. Alternatively, a driving scenario may be generated by giving priority to the state of charge SOC_clc not reaching the allowable upper limit or the allowable lower limit.

Figure 8:
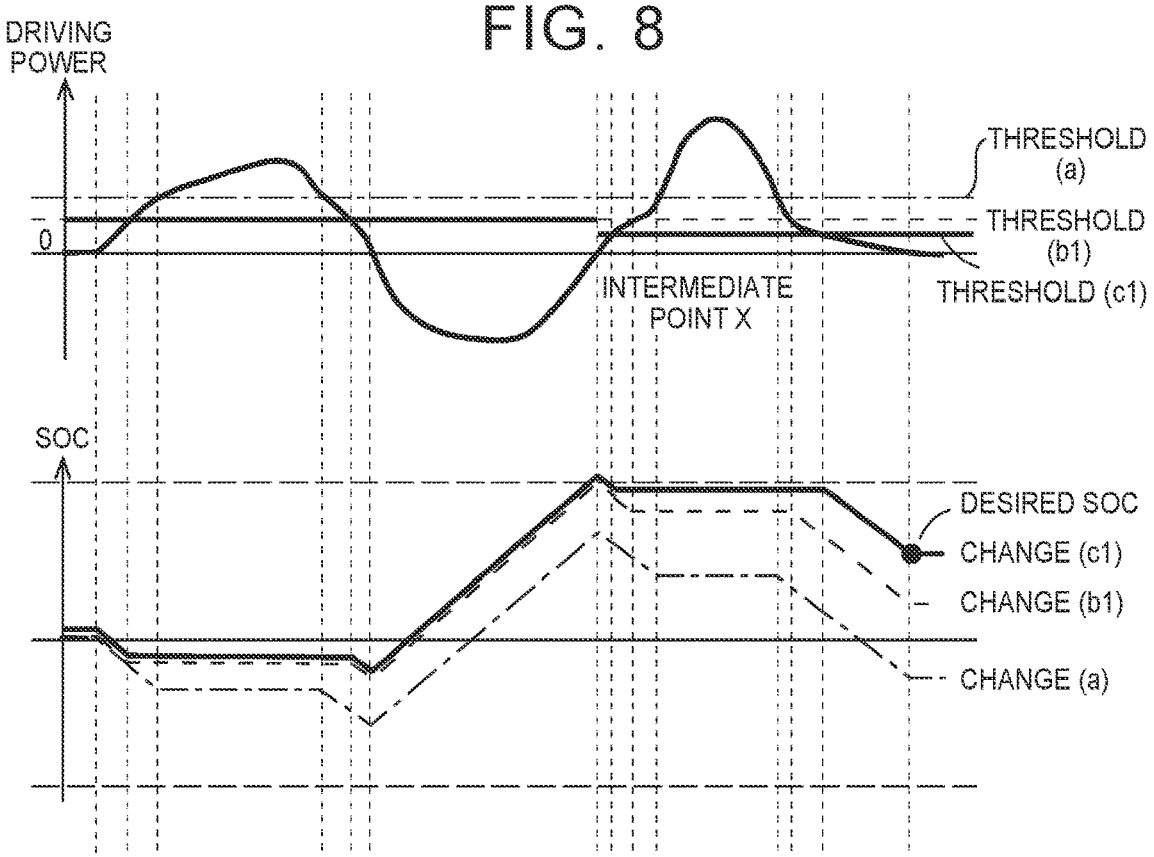
FIG. 8 shows an example of a threshold value determination method (limitation by an allowable upper limit)
Figure 9:
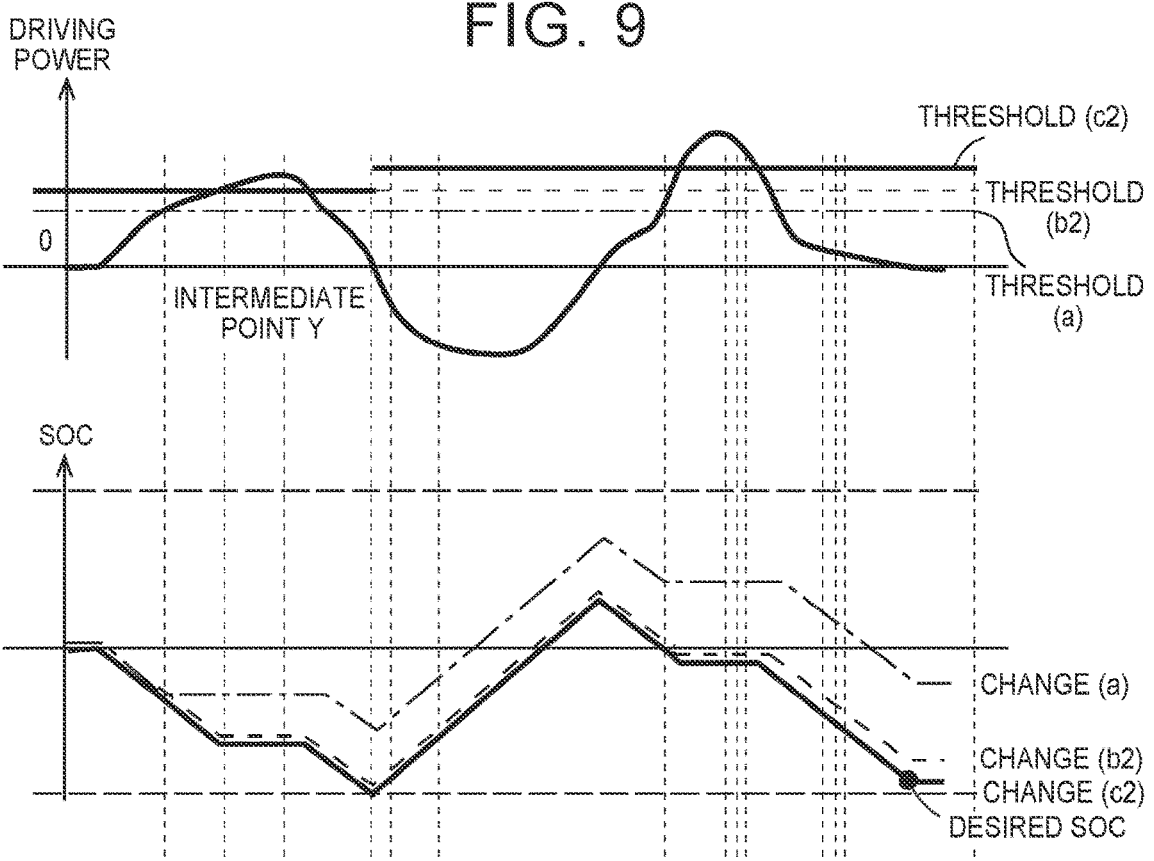
FIG. 9 shows an example of the threshold value determination method (limitation by an allowable lower limit)

FIGS. 8 and 9 show an example of a method for determining the threshold P_swt that is a driving scenario. FIG. 8 illustrates an example in which there is an intermediate point at which the state of charge SOC_clc reaches the allowable upper limit of the battery 41. FIG. 9 illustrates an example in which there is an intermediate point at which the state of charge SOC_clc reaches the allowable lower limit of the battery 41.

In FIG. 8, first, a threshold (a) that is an initial value of the threshold P_swt is applied to the driving power profile to estimate a change (a) in state of charge SOC_clc of the battery 41. With this change (a), the desired state of charge SOC_tgt cannot be achieved upon arrival at the destination. Therefore, the threshold P_swt is corrected to a lower threshold (b1). The desired state of charge SOC_tgt cannot be achieved even with this threshold (b1). However, there is an intermediate point X at which the state of charge SOC_clc reaches the allowable upper limit. Therefore, the threshold (b1) is determined to be the threshold from the point of departure to the intermediate point X. Finally, a threshold (c1) corresponding to such a change (c1) that the desired state of charge SOC_tgt is achieved upon arrival at the destination is determined to be the threshold from the intermediate point X to the destination. By this method, such a driving scenario is generated that drive mode switch control is performed based on the threshold (b1) during the period from the point of departure to the intermediate point X and drive mode switch control is performed based on the threshold (c1) during the period from the intermediate point X to the destination.

In FIG. 9, first, a threshold (a) that is an initial value of the threshold P_swt is applied to the driving power profile to estimate a change (a) in state of charge SOC_clc of the battery 41. With this change (a), the desired state of charge SOC_tgt cannot be achieved upon arrival at the destination. Therefore, the threshold P_swt is corrected to a higher threshold (b2). The desired state of charge SOC_tgt cannot be achieved even with this threshold (b2). However, there is an intermediate point Y at which the state of charge SOC_clc reaches the allowable lower limit. Therefore, the threshold (b2) is determined to be the threshold from the point of departure to the intermediate point Y. Finally, a threshold (c2) corresponding to such a change (c2) that the desired state of charge SOC_tgt is achieved upon arrival at the destination is determined to be the threshold from the intermediate point Y to the destination. By this method, such a driving scenario is generated that drive mode switch control is performed based on the threshold (b2) during the period from the point of departure to the intermediate point Y and drive mode switch control is performed based on the threshold (c2) during the period from the intermediate point Y to the destination.

By the above process, a change in power consumption and the amount of regenerative energy recovery in one trip can be estimated, and based on this estimation, such a driving scenario can be generated that the estimated regenerative energy E_est is completely consumed as well as the desired state of charge SOC_tgt is achieved upon arrival at the destination while improving fuel efficiency. The driving scenario is reviewed when the difference between the estimated value and the value obtained by actual driving of the vehicle becomes large. Accordingly, optimum driving control can always be implemented.

Modifications

Figure 10:
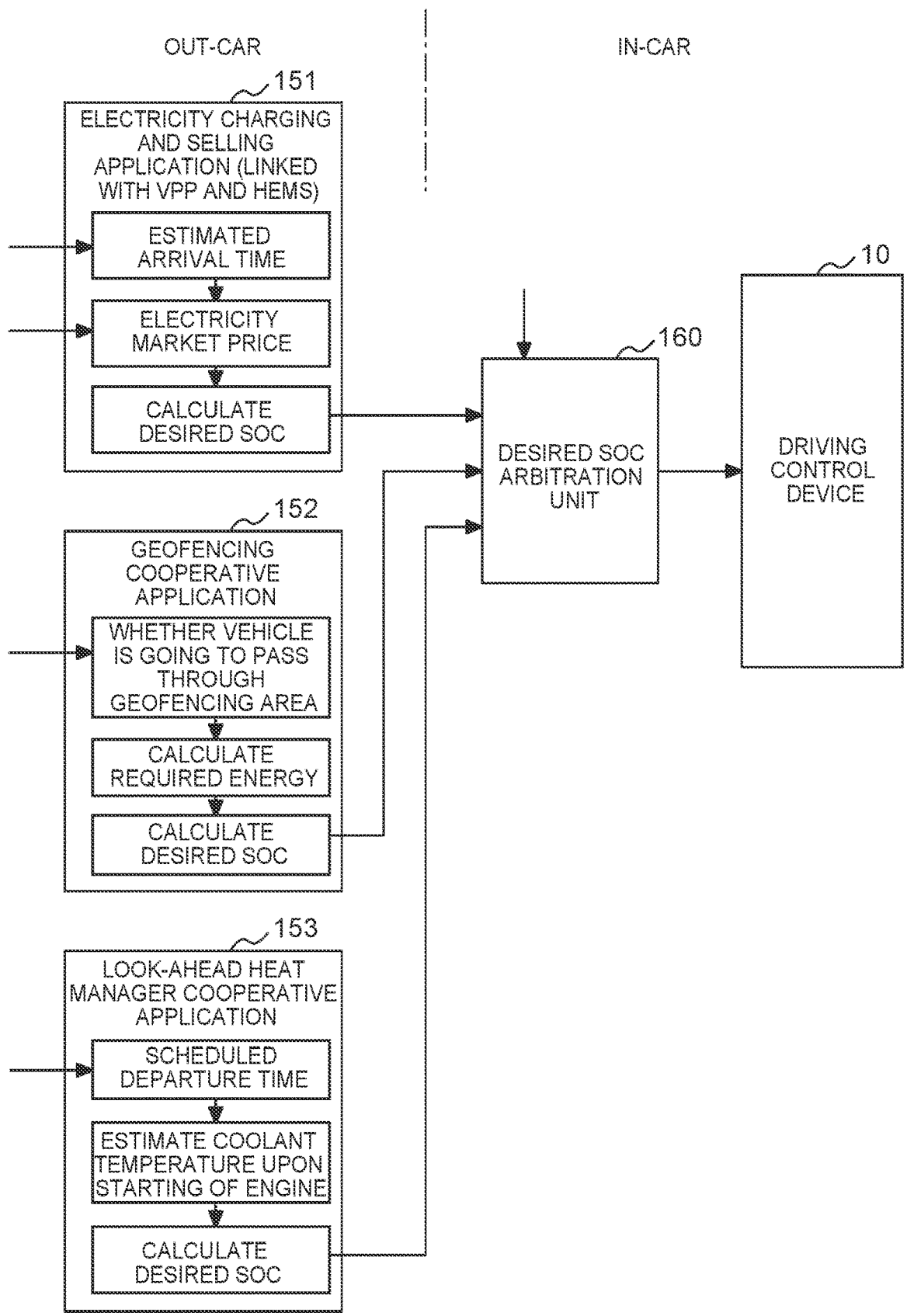
FIG. 10 shows a configuration example in which the driving control device considers cooperation with out-car cooperative applications.

A modification example will be described in which the driving control device 10 according to the embodiment suitably controls the desired state of charge SOC_tgt of the battery 41 in cooperation with various applications outside the vehicle (out-car). FIG. 10 shows a configuration example in which the driving control device 10 according to the embodiment considers cooperation with out-car cooperative applications. In the example of FIG. 10, an electricity charging and selling application (linked with a Virtual Power Plant (VPP) and a Home Energy Management System (HEMS)) 151, a geofencing cooperative application 152, and a look-ahead heat manager cooperative application 153 are shown as the out-car cooperative applications.

The electricity charging and selling application 151 is a control application that links with electricity trading for which the user of the vehicle has a contract. The electricity charging and selling application 151 calculates a desired state of charge based on the vehicle's estimated time of arrival at the destination and the expected electricity market price at the estimated time of arrival. For example, the electricity charging and selling application 151 calculates the desired state of charge as to high when the expected electricity market price at the estimated time of arrival at the destination is high (up). The electricity charging and selling application 151 calculates the desired state of charge as to low when the expected electricity market price at the estimated time of arrival at the destination is low (down). The battery can thus be charged as much as possible at a low price when the vehicle arrives at a home with power charging equipment or a charging station. The estimated time of arrival at the destination may be automatically acquired from a system inside the vehicle (in-car) or may be manually entered by the user, the driver, etc. As the electricity market price, a fixed value may be manually entered by the user, the driver, etc., or a variable value may be automatically acquired from a related organization via a Data Communication Module (DCM). The desired state of charge calculated by the electricity charging and selling application 151 is output to a desired state of charge arbitration unit 160.

The geofencing cooperative application 152 is a control application that links with entry and exit to and from a geofence that is a virtual boundary. The geofencing cooperative application 152 calculates a desired state of charge based on whether the vehicle is going to pass through a geofencing area and the energy required for driving. For example, when the geofencing area is an area where only EV driving is permitted, the geofencing cooperative application 152 calculates a desired state of charge higher than a standard value before the vehicle enters this area. Whether the vehicle is going to pass through the geofencing area can be automatically acquired from the system inside the vehicle. The desired state of charge calculated by the geofencing cooperative application 152 is output to a desired state of charge arbitration unit 160.

The look-ahead heat manager cooperative application 153 is a control application linked with the use of heat energy in the vehicle. The look-ahead heat manager cooperative application 153 calculates a desired state of charge based on the scheduled departure time of the vehicle and the estimated coolant temperature upon starting of the internal combustion engine at the scheduled departure time. For example, when the estimated coolant temperature for the scheduled departure time is low, the look-ahead heat manager cooperative application 153 calculates the desired state of charge as to high because a large amount of power is required to heat the coolant. When the estimated coolant temperature for the scheduled departure time is high, the look-ahead heat manager cooperative application 153 calculates the desired state of charge as to low because only a small amount of power is required to heat the coolant. The scheduled departure time may be automatically acquired from the system inside the vehicle or may be manually entered by the user, the driver, etc. The desired state of charge calculated by the look-ahead heat manager cooperative application 153 is output to the desired state of charge arbitration unit 160.

In this modification example, the desired state of charge arbitration unit 160 arbitrates between or among a plurality of desired states of charge including the state of charge generated in the vehicle (in-car) and the desired states of charge requested by one or more applications outside the vehicle (out-car). The desired state of charge arbitration unit 160 is provided in a stage before the driving control device 10. The desired state of charge arbitration unit 160 is suitably provided on the vehicle side. The desired state of charge arbitration unit 160 performs arbitration between or among the desired states of charge based on predetermined priorities. For example, the first priority is vehicle laws and regulations, the second priority is the vehicle user's power trading contract, and the third priority is actual fuel efficiency and power efficiency. When the above priorities are applied to the applications shown in FIG. 10, the priorities are given in the order of the geofencing cooperative application 152, the electricity charging and selling application 151, and the look-ahead heat manager cooperative application 153. The desired state of charge arbitration unit 160 outputs the desired state of charge that is the arbitration result according to the priorities to the driving control device 10. The acquisition unit 11 of the driving control device 10 sets the desired state of charge SOC_tgt to the desired state of charge acquired from the desired state of charge arbitration unit 160.

By such control, the driving control device 10 can suitably control the desired state of charge SOC_tgt of the battery 41 in cooperation with the various out-car applications. It is also possible to change the desired state of charge SOC_tgt in real time by the out-car cooperation applications even while the vehicle is running. It is thus possible to perform the drive mode switching control in real time according to the changed state of charge SOC_tgt.

Effects

According to the driving control device according to the above embodiment, the amount of regenerative energy recovery is quantitatively estimated at an early stage by using such a driving power profile based on the past driving histories that shows in chronological order a predicted change in driving power that is generated by the power sources during driving from a point of departure to a destination. By using the estimation results, the driving control device can perform suitable driving control in consideration of the desired state of charge of the battery.

This driving control device performs control to drive the vehicle with the electric motor under a driving condition with low engine efficiency so that the internal combustion engine can be driven in a region with as high engine efficiency as possible. This driving control device performs control to reduce the state of charge of the battery in advance to eliminate or reduce unrecovered energy, when it can be estimated that the regenerative energy is large, such as on a downhill. This driving control device controls the drive mode by setting the first and second sections so that the state of charge of the battery does not become higher than the allowable upper limit and does not become lower than the allowable lower limit. Progress of battery deterioration can thus be reduced or prevented. With these controls, fuel efficiency can be suitably improved while completely consuming the estimated regenerative energy as well as achieving the desired state of charge upon arrival at the destination.

Although one embodiment of the present disclosure is described above, the present disclosure can be modified as appropriate. The present disclosure can be interpreted not only as a driving control device but also as a driving control method that is performed by a driving control device including a processor and a memory, a driving control program, a computer-readable non-transitory storage medium storing the driving control program, a vehicle equipped with the driving control device, etc.

The present disclosure is useful for driving control devices mounted on vehicles etc.

What is claimed is:

1. A driving control device mounted on a vehicle including an electric motor and an internal combustion engine as power sources, the driving control device comprising a processor configured to:
    acquire a destination of the vehicle;
    acquire a past driving history from a point of departure to the destination;
    acquire a desired state of charge that is a state of charge of a battery desired when the vehicle arrives at the destination, the battery being mounted on the vehicle;
    estimate a predicted amount of regenerative energy based on the driving history, the regenerative energy being energy that is recovered by regenerative braking of the electric motor;
    set a first section and a second section based on the predicted amount of regenerative energy and the desired state of charge, the first section being a section in which only the electric motor is driven for driving of the vehicle, the second section being a section in which at least the internal combustion engine is driven for driving of the vehicle; and
    control driving of the vehicle based on the first section and the second section.

2. The driving control device according to claim 1, wherein the driving history includes information showing in chronological order a change in power generated by the power sources during driving from the point of departure to the destination in a past.

3. The driving control device according to claim 2, wherein the processor is configured to estimate a time integral value of a magnitude of power generated by the power sources during a period in which energy is recoverable as the predicted amount of regenerative energy, the period being a period in which the power generated by the power sources in the driving history is negative.

4. The driving control device according to claim 1, wherein the processor is configured to set the first section and the second section in such a manner that all the predicted amount of regenerative energy is consumed when the vehicle arrives at the destination.

5. The driving control device according to claim 1, wherein the processor is configured to set the first section and the second section in such a manner that the state of charge of the battery does not become higher than an allowable upper limit or does not become lower than an allowable lower limit.

6. The driving control device according to claim 2, wherein the processor is configured to:
    derive a difference between a first integral value and a second integral value, the first integral value being a time integral value of a magnitude of power generated by the power sources up to a current point based on the driving history, the second integral value being a time integral value of a magnitude of power generated by the power sources based on actual driving of the vehicle; and
    reset the first section and the second section from the current point to the destination when an absolute value of the derived difference is equal to or larger than a predetermined reference value.

7. The driving control device according to claim 1, wherein the processor is configured to:
    arbitrate between or among states of charge of the battery that are requested by a plurality of applications; and
    acquire an arbitration result as the desired state of charge.

8. A driving control method that is performed by a driving control device mounted on a vehicle including an electric motor and an internal combustion engine as power sources, the driving control method comprising:
    acquiring a destination of the vehicle;
    acquiring a past driving history from a point of departure to the destination;
    acquiring a desired state of charge that is a state of charge of a battery desired when the vehicle arrives at the destination, the battery being mounted on the vehicle;
    estimating a predicted amount of regenerative energy based on the driving history, the regenerative energy being energy that is recovered by regenerative braking of the electric motor;
    setting a first section and a second section based on the predicted amount of regenerative energy and the desired state of charge, the first section being a section in which only the electric motor is driven for driving of the vehicle, the second section being a section in which at least the internal combustion engine is driven for driving of the vehicle; and
    controlling driving of the vehicle based on the first section and the second section.

9. A non-transitory storage medium storing instructions that are executable by one or more processors of a driving control device mounted on a vehicle including an electric motor and an internal combustion engine as power sources and that cause the one or more processors to perform functions comprising:
    acquiring a destination of the vehicle;
    acquiring a past driving history from a point of departure to the destination;
    acquiring a desired state of charge that is a state of charge of a battery desired when the vehicle arrives at the destination, the battery being mounted on the vehicle;
    estimating a predicted amount of regenerative energy based on the driving history, the regenerative energy being energy that is recovered by regenerative braking of the electric motor;
    setting a first section and a second section based on the predicted amount of regenerative energy and the desired state of charge, the first section being a section in which only the electric motor is driven for driving of the vehicle, the second section being a section in which at least the internal combustion engine is driven for driving of the vehicle; and
    controlling driving of the vehicle based on the first section and the second section.

* * * * *